US011132287B2

(12) United States Patent
Bolajwar et al.

(10) Patent No.: US 11,132,287 B2
(45) Date of Patent: Sep. 28, 2021

(54) SYNTHETIC TEST RECORDER INSTALLED INLINE WITH A WEB PORTAL

(71) Applicant: Dynatrace LLC, Waltham, MA (US)

(72) Inventors: Vivekanand Bolajwar, Woburn, MA (US); Alexander Francoeur, West Newbury, MA (US)

(73) Assignee: Dynatrace LLC, Waltham, MA (US)

( * ) Notice: Subject to any disclaimer, the term of this patent is extended or adjusted under 35 U.S.C. 154(b) by 615 days.

(21) Appl. No.: 15/157,765

(22) Filed: May 18, 2016

(65) Prior Publication Data
US 2017/0337122 A1 Nov. 23, 2017

(51) Int. Cl.
G06F 9/00 (2006.01)
G06F 11/36 (2006.01)

(52) U.S. Cl.
CPC ...... G06F 11/3688 (2013.01); G06F 11/3684 (2013.01); G06F 11/3692 (2013.01)

(58) Field of Classification Search
CPC ............ G06F 11/3688; G06F 11/3684; G06F 11/3663
See application file for complete search history.

(56) References Cited

U.S. PATENT DOCUMENTS

| | | | | |
|---|---|---|---|---|
| 9,336,126 B1* | 5/2016 | Masse | ................. | G06F 11/3672 |
| 2003/0191800 A1* | 10/2003 | Challenger | ....... | G06F 17/30902 |
| | | | | 709/203 |
| 2004/0111727 A1* | 6/2004 | Schwarzbauer | ........ | H04L 43/08 |
| | | | | 719/310 |
| 2007/0047279 A1* | 3/2007 | Evans | ..................... | G06F 9/541 |
| | | | | 365/1 |
| 2008/0310408 A1* | 12/2008 | Thompson | ............. | G06Q 30/02 |
| | | | | 370/386 |
| 2009/0052863 A1* | 2/2009 | Parmar | ................ | G11B 27/034 |
| | | | | 386/323 |
| 2009/0133000 A1* | 5/2009 | Sweis | ................. | G06F 11/3688 |
| | | | | 717/124 |
| 2010/0088404 A1* | 4/2010 | Mani | ...................... | H04L 67/02 |
| | | | | 709/224 |
| 2011/0145783 A1* | 6/2011 | Seshan | ...................... | G06F 8/10 |
| | | | | 717/105 |
| 2011/0173526 A1* | 7/2011 | Schwarzbauer | ........ | G06F 11/36 |
| | | | | 715/234 |
| 2011/0191676 A1* | 8/2011 | Guttman | ................... | G06F 3/00 |
| | | | | 715/716 |

(Continued)

Primary Examiner — Lewis A Bullock, Jr.
Assistant Examiner — Mohammad H Kabir
(74) Attorney, Agent, or Firm — Harness, Dickey & Pierce, P.L.C.

(57) ABSTRACT

A computer-implemented system is presented that enables automated testing of web applications operating within a web browser. The system is comprised of a recorder and a recorder interface. The recorder is configured to capture events received from a web page under test and operates to record the captured events in a test script, where the test script is defined in accordance with a scripting language. The recorder is implemented as a browser extension of the web browser. The recorder interface is configured to receive the test script from the recorder and transmit the test script from the computing device to a web portal hosted on a server located remotely from the computing device, where the test script is transmitted from the recorder interface to the web portal using web messaging.

20 Claims, 14 Drawing Sheets

(56) References Cited

U.S. PATENT DOCUMENTS

| | | | |
|---|---|---|---|
| 2012/0174075 A1* | 7/2012 | Carteri | G06F 11/3688 717/127 |
| 2013/0104122 A1* | 4/2013 | Lin | G06F 13/385 717/176 |
| 2013/0198521 A1* | 8/2013 | Wu | G06F 21/6209 713/175 |
| 2015/0134956 A1* | 5/2015 | Stachura | H04L 63/0807 713/168 |
| 2016/0004628 A1* | 1/2016 | Gugri | G06F 11/3688 717/124 |

* cited by examiner

FIG. 4A

≡ ⌕ Search your environment...                                   Buy now | 11 | 🖵 | 👤
Home ⟩ Web checks ⟩ Bowie 6 plus ⟩ Settings

Web check monitor settings                                                    Done ⋯
Name this web check
[ Bowie 6 plus                ] *

Define monitoring schedule
How frequently should this web check run at each selected location?
Monitor my website every
━━━━━● 15 min Device profile
Select the device profile you'd like your web check to emulate

[ Desktop      ▾ ] [□|□] Screen size  [ 1024 ] x [ 768 ] px
Network              User agent
[ No throttling ▾ ]  [ Default ruxit user agent ]

Recorded clickpath
Expand each action to add content validation edit wait time and adjust input text where needed.
⊙ Enable clickpath recording and local validation with cleaned cookies Action ─────────────── Configuration ──────────────────── Delete ─ Edit

| 1 | No image available yet, validate clickpath to show image | 🌐 Navigate<br>Action name<br>[ navigate to "http://www.davidbowie.com" ] | × | ⌄ |

| 2 | No image available yet, validate clickpath to show image | 👆 Tap<br>Action name<br>[ tap ] | × | ⌄ |

| 3 | No image available yet, validate clickpath to show image | 👆 Tap<br>Action name<br>[ tap on "Menu" ] | × | ⌄ |

[ Update web check ] [ Cancel ]

FIG. 4B

≡ ⌕ Search your environment...　　　　　　　　　　　　　　Buy now | 11 | ⊟ ⊕

Home ⟩ Web checks ⟩ Bowie 6 plus ⟩ Settings ⟩ Record clickpath

Web check settings Bowie 6 plus　　　　　　　　　　Done | Playback actions

- General configuration
- Recorded clickpath
- Monitoring schedule
- Validate content
- Outage configuration
- Performance threshold

Recorded clickpath

Expand each action to add content validations, edit wait time and adjust input text where needed.

◉ Enable clickpath recording and local validation with cleared cookies.

ActionConfiguration ——————————————————— Delete — Edit

1. ⊕ Navigate　　　　　　　　　　　　　　　　　　　× ⌄
   Action name
   [navigate to "http://www.davidbowie.com"]

2. ☌ Tap　　　　　　　　　　　　　　　　　　　× ⌄
   Action name
   [tap]

3. ☌ Tap　　　　　　　　　　　　　　　　　　　× ⌄
   Action name
   [tap on "Menu"]

4. ☌ Tap　　　　　　　　　　　　　　　　　　　× ⌄
   Action name
   [tap]

5. ☌ Tap　　　　　　　　　　　　　　　　　　　× ⌄
   Action name
   [tap on "49256"]

FIG. 4C

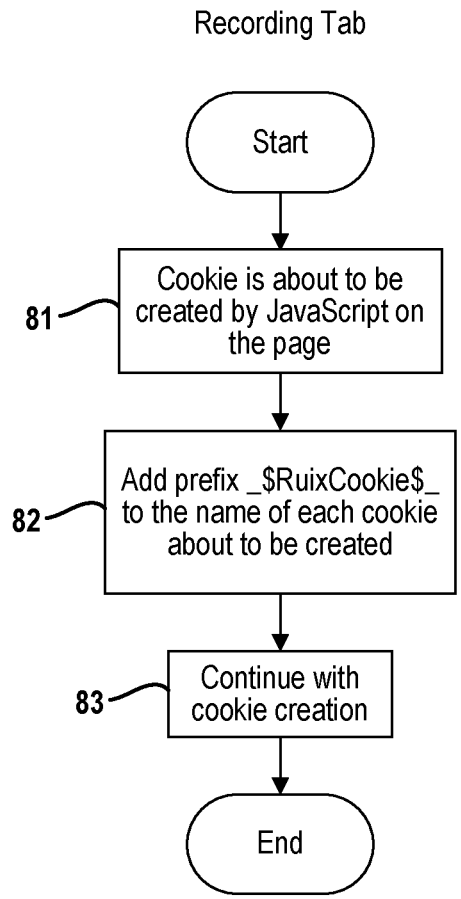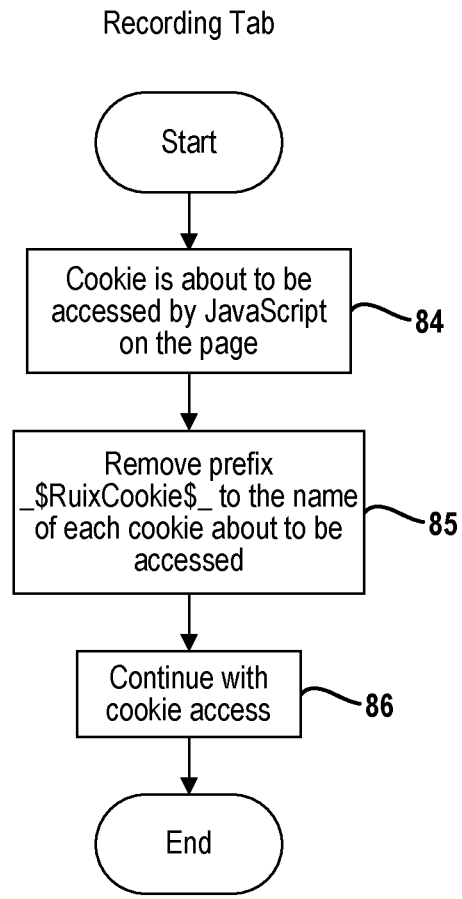
FIG. 5B
FIG. 5C

SYNTHETIC TEST RECORDER INSTALLED INLINE WITH A WEB PORTAL

FIELD

The present disclosure relates to synthetic or automated testing of web applications.

BACKGROUND

Synthetic testing of sophisticated web applications requires automatically repeating a series of steps to navigate through an important business process. These are often actions like a login, product searches, add to shopping cart and checkout. The creation and storage of this action sequence and the proper data entry needed along the way is often referred to as a "script". Testing tools often require the user to manually create this script, or install a separate tool to create a script. Once the script is created, there is often no way to test that it actually works until it is run within the full test environment, making it slow and difficult to diagnose problems and repair if needed.

Therefore, it is desirable to provide a synthetic test recorder tool that can be seamlessly downloaded from a web portal and integrated with a user's web browser.

This section provides background information related to the present disclosure which is not necessarily prior art.

SUMMARY

This section provides a general summary of the disclosure, and is not a comprehensive disclosure of its full scope or all of its features.

A computer-implemented system is provided that enables automated testing of web applications operating within a web browser. The system is comprised generally of a recorder, a recorder interface and a web portal. The recorder is configured to capture events received from a web page under test and operates to record the captured events in a test script, where the test script is defined in accordance with a scripting language. The recorder interface is configured to receive the test script from the recorder and transmit the test script from the computing device to a web portal hosted on a server located remotely from the computing device, where the test script is transmitted from the recorder interface to the web portal using web messaging. Of note, the recorder is implemented as a browser extension that is installed in-line with a synthetic test creation screen of the web portal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is an example user interface for creating a test script;

FIG. 4B is an example user interface for configuring recording settings;

FIG. 4C is an example user interface for editing a test script;

FIGS. 5A, 5B and 5C are flow diagrams illustrating a technique for managing a virtual profile for the synthetic test recorder;

Corresponding reference numerals indicate corresponding parts throughout the several views of the drawings.

DETAILED DESCRIPTION

Example embodiments will now be described more fully with reference to the accompanying drawings.

Figure 1:
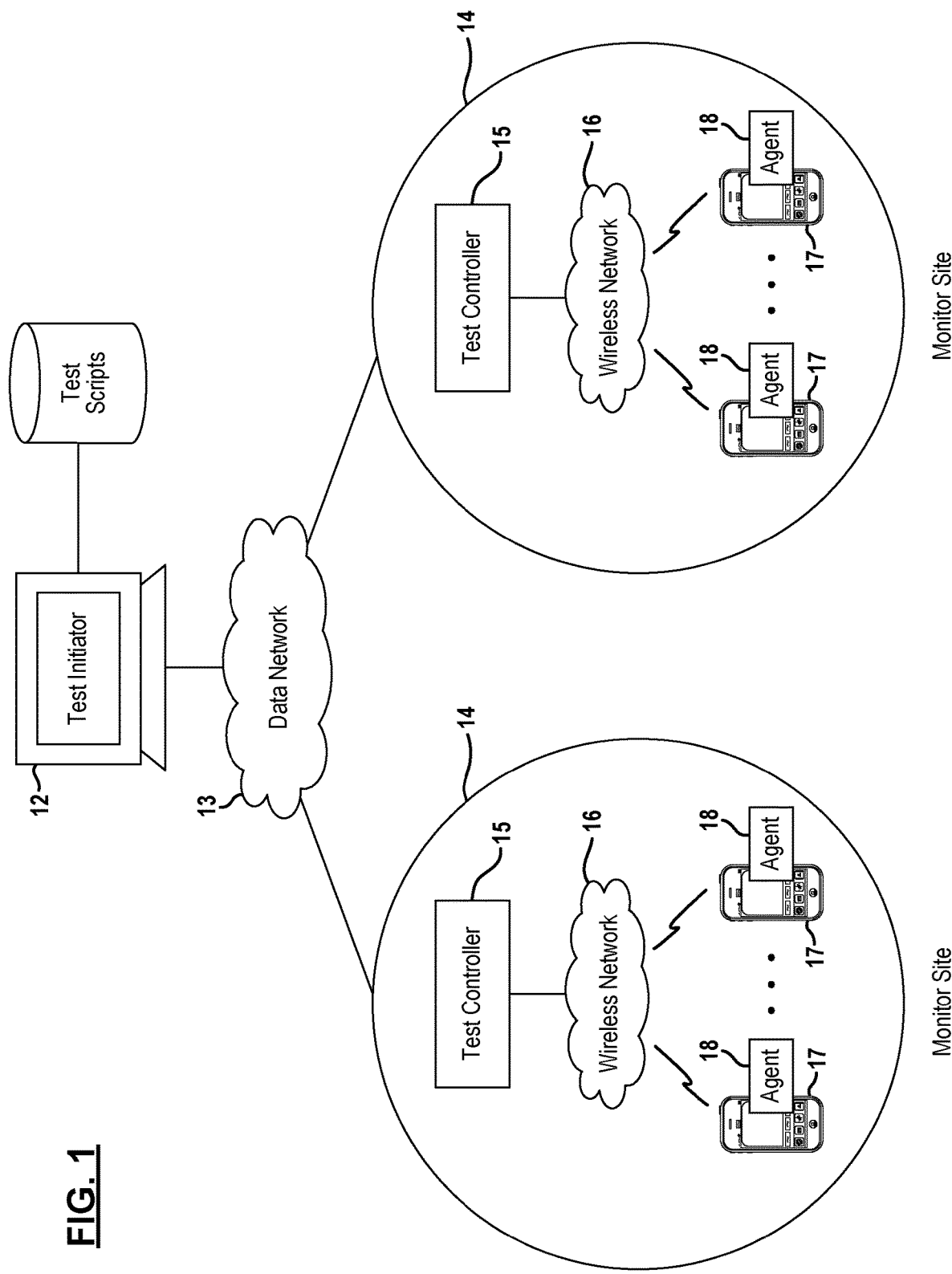
FIG. 1 is a diagram depicting an exemplary computer-implemented system that enables automated testing of a plurality of computing devices.

FIG. 1 depicts an exemplary computer-implemented system 10 that enables automated (synthetic) testing of a plurality of computing devices residing at one or more monitor sites 14. The system is comprised generally of a test initiator 12 interfaced via a data network 13 (e.g., the Internet) with one or more remote monitor sites 14. The test initiator 12 provides a front-end interface for initiating tests, controlling the devices under test and collecting test results from the devices under test. In an exemplary embodiment, the test initiator 12 may be implemented on a personal computer. Monitor sites 14 may be set up at disperse geographic locations depending on the testing requirements. A similar testing environment is the Ruxit Synthetic Monitoring tool commercially available from Dyantrace LLC. While the description set forth below makes reference to a distributed testing environment having stationary mobile device, it is readily understood that the testing environment may be implemented on one or more server devices residing at a single location or different locations.

Each monitor site 14 hosts a test controller 15 and a plurality of computing devices 17. The test controller 15 operates to receive a test request from the test initiator 12 and transmit the test request to one or more of the mobile devices 17. During the course of the test, the test controller 15 may receive other commands or control notifications pertaining to the test from the test initiator 12, such as a command to interrupt or terminate the test as well as commands to install an application, uninstall an application, reboot an application, etc. These commands are also passed along asynchronously to the applicable mobile device 17. During the course of the test, computing devices under test 17 may send notifications or messages asynchronously back to the test initiator 12. Likewise, these notifications may be sent to the test controller 15 which in turn forwards the notifications to the test initiator 12. Exemplary computing devices may include but are not limited to mobile phones, tablet computers, laptop computers and servers.

Each computing device 17 is configured with a test agent 18 (also referred to herein as a playback agent). The test agent 18 is generally responsible for carrying out or executing the test. In one exemplary embodiment, the test agent 18 is pre-configured to perform the steps of the test in response to a test request received from the test controller 15. In another embodiment, the test agent 18 executes steps for the test, where the steps are embodied in the test request received from the test controller 15. In yet another embodiment, the test agent 18 is configured to retrieve a test script upon receipt of the test request. The test script is retrieved from a repository 11 located remote from the monitor site 14, for example, at the site of the test initiator 12. In this case, the test agent 18 may retrieve the test script via the test controller 15 using a persistent data channel. Alternatively, the test agent 18 may retrieve the test script directly from the test initiator 12 using a secondary communication channel such as a WiFi or cellular link. In either case, the test agent performs the test by executing the retrieved test script. Other types of secondary data links are contemplated by this disclosure.

Figure 2:
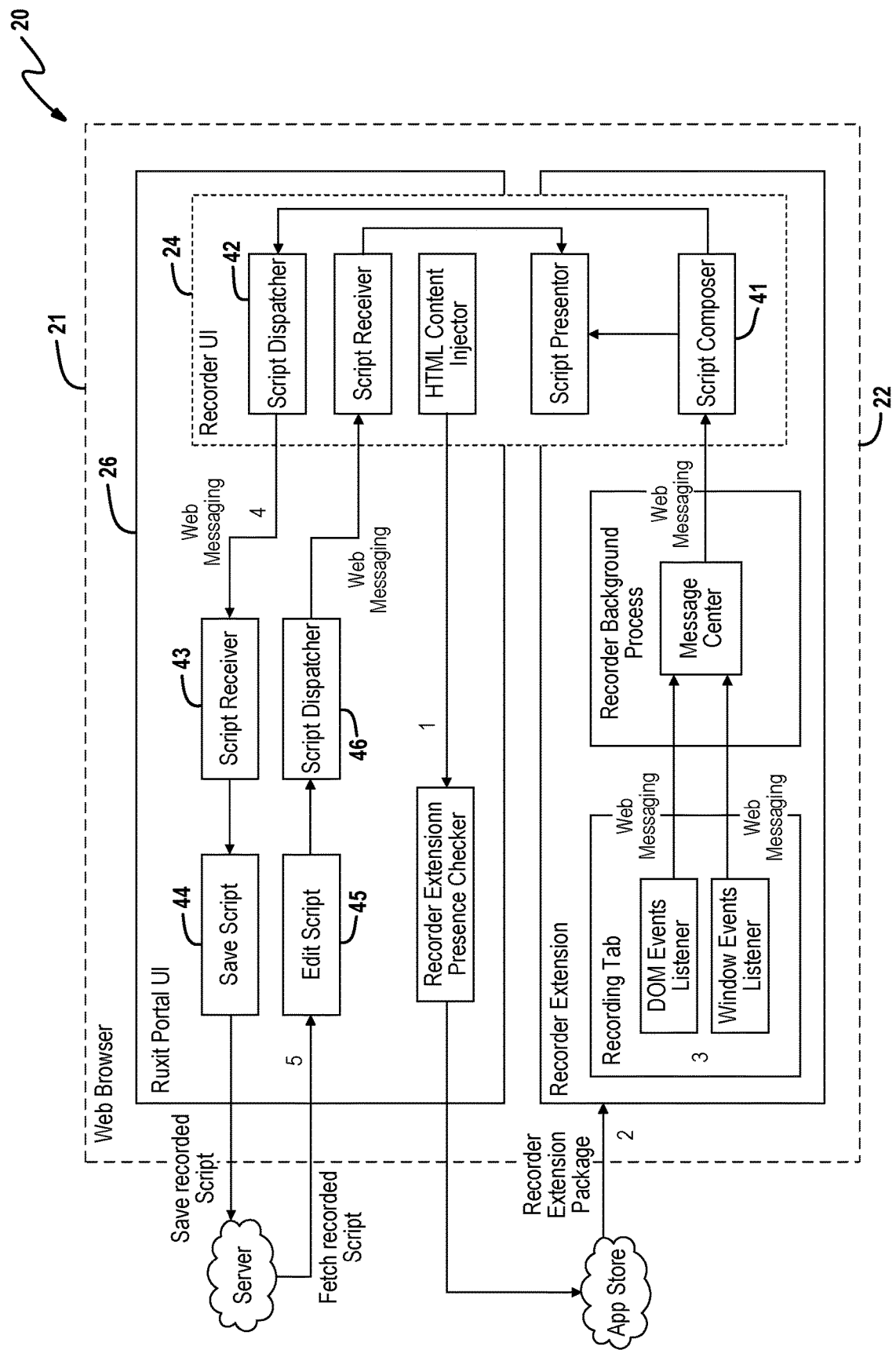
FIG. 2 is a block diagram depicting a synthetic test recorder installed in line with a web portal and how the data flows between web portal and synthetic web recorder.

FIG. 2 depicts an example implementation for a test script development tool 20. The test script development tool 20 is comprised generally of a recorder 22, a recorder user interface 24 and a web portal user interface 26 residing on a host computing device. The primary goal for the recorder 22 was to create a seamless synthetic test creation experience. To accomplish this, the recorder 22 operates within a web browser 21 (e.g., Google's Chrome or Apple's Safari web browser) and within the same context as the web portal 26. Specifically, the recorder 22 is implemented as a browser extension that is installed in-line with the synthetic test creation screen of the web portal 26 as will be further described below.

The web portal user interface 26 enables a user to load a web page to be tested. During loading of the web page, the web portal UI 26 determines whether the recorder 22 is installed on the host computing device. In response to a determination that the recorder 22 is not installed on the host computing device, the web portal UI 26 asks user to install the recorder 22 from an app store (e.g., Google Web Store) by clicking a link or button. The recorder is in turn downloaded to the host computing device. If the recorder 22 is already installed, the user may begin creating a script via the web portal user interface 26.

Figure 3:
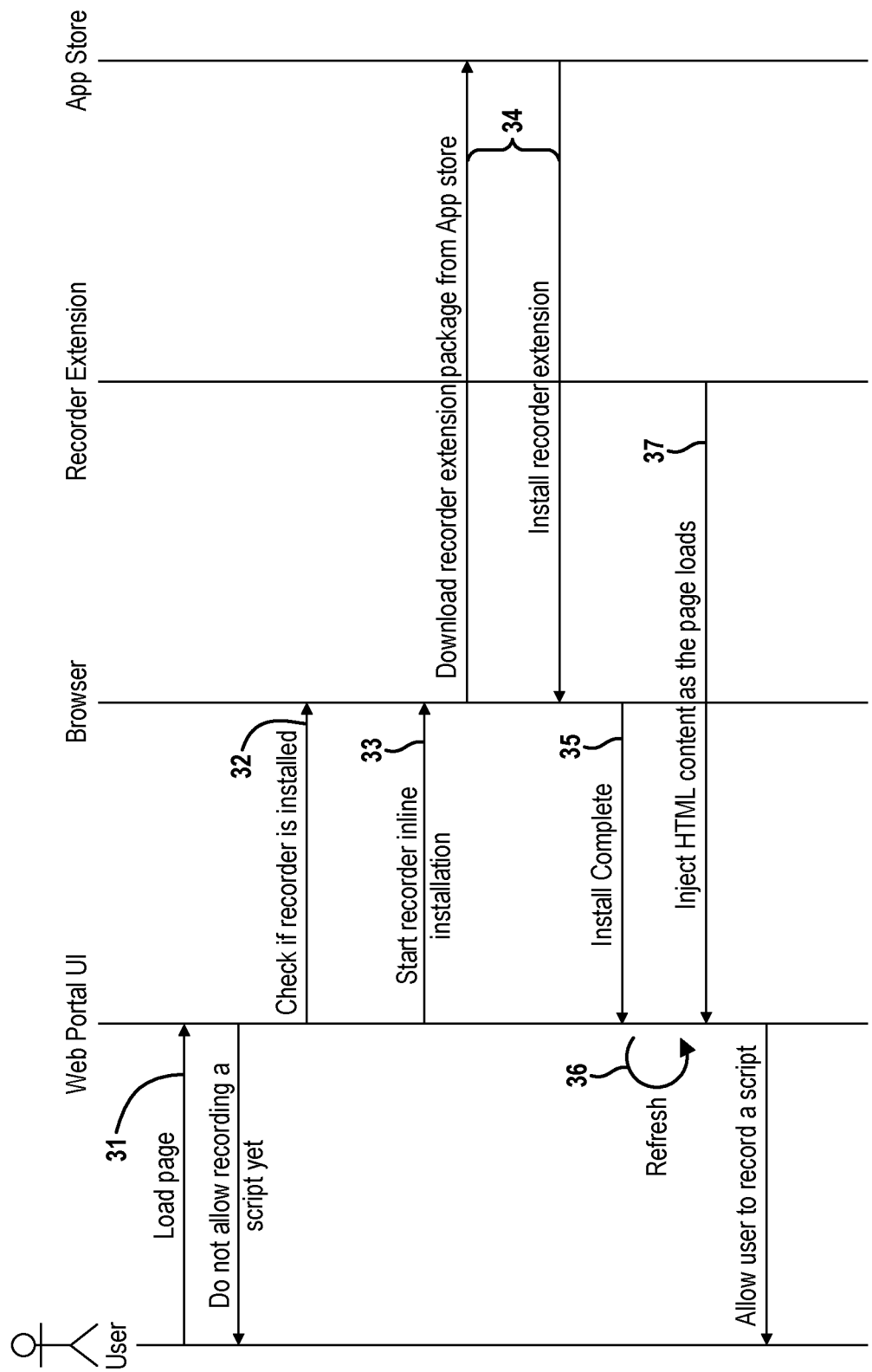
FIG. 3 is a sequence timing diagram depicting how the recorder is installed.

With reference to FIG. 3, the process for installing the recorder 22 and recorder user interface 24 is further described. First, the user loads the web page to be tested at 31 using the web portal user interface 26. The web portal UI then checks at 32 if a recorder 22 has been installed on the host computing device. In an example embodiment, the web portal UI 26 checks for the presence of the recorder 22 by determining whether particular HTML elements are inserted into the HTML content of the web portal UI. For example, the web portal UI 26 can check for a <span> tag or another type of identifier used to group inline-elements in a document. The <span> tag with "ID" attribute uniquely identifies the recorder and will be inserted into the HTML for the web portal UI 26 when the recorder is installed as further described below. Other techniques for detecting the presence of the recorder 22 are also contemplated by this disclosure.

When the recorder 22 is not present, the web portal UI 26 asks the user to start the inline installation of the recorder at 33 by clicking on either a link or a button. More specifically, once the user starts the inline installation, the web portal UI 26 places a functional call to the web browser and the web browser in turn contacts an app store. In response to the download request, the recorder extension package is downloaded from the app store to the host computing device. The recorder 22 is downloaded and installed from the app store using techniques readily known in the art.

Once completed, the web browser notifies the web portal UI at 35 that the recorder installation is complete. In response to this notification, the web portal UI 26 performs a refresh as indicated at 36. The web portal UI can initiate the refresh by placing a function call to the web browser. During the refresh, the downloaded recorder extension at 37 injects HTML content into the page for the web portal UI as it is being loaded. Of note, the recorder extension inserts the <span> tag with unique value to its "ID" attribute into the HTML content for the web portal. In this way, upon completion of the refresh, the recorder is available for use and can be made available by the web portal UI 26. It is to be understood that only the relevant steps of the methodology are discussed in relation to FIG. 3, but that other software-implemented instructions may be needed to control and manage the overall operation of the system.

Figure 4A:
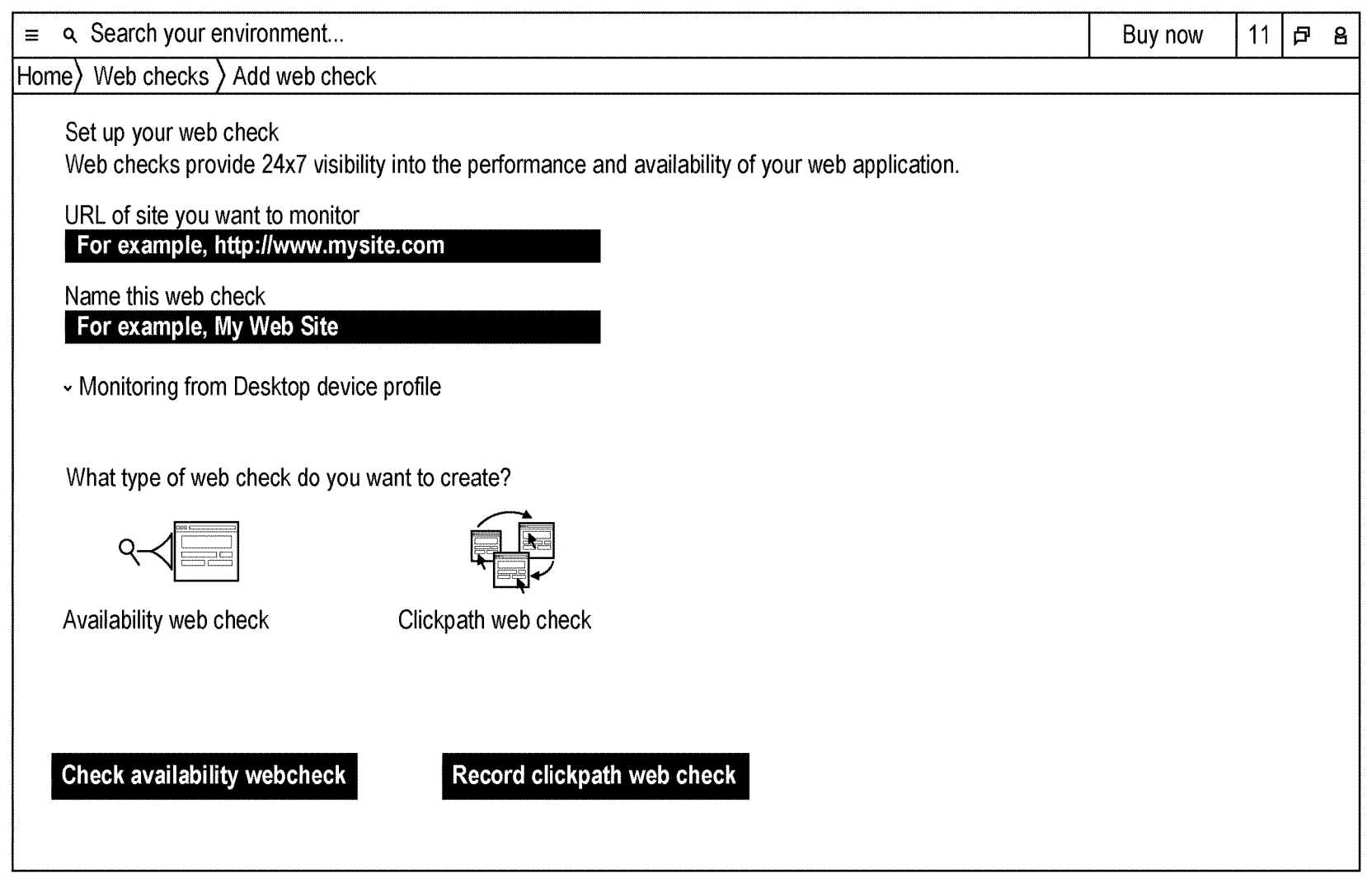

With continued reference to FIG. 2, the web portal UI 26 allows the user to navigate through a transaction on the web page under test in a browser window once the recorder 22 has been installed. FIG. 4A illustrates an example user interface for initiating creation of a test script. The user first enters the URL of the web page being monitored and provides a name for the recording session. The user then clicks a record button or provides another trigger to start recording. Prior to simulating a transaction on the web page under test, the user may be prompted to configure various setting associated with the recording session. For example, the user may specify the type of device being emulated and/or network conditions that are to be emulated during the recording. An example user interface for configuring such settings is shown in FIG. 4B.

During the transaction, the recorder 22 is configured to capture events received from the web page under test and record the captured events in a test script, where the test script is defined in accordance with a scripting language. Captured events include but are not limited to typing in form fields, button clicks and cookie exchanges between the web application and the web browser. In one embodiment, the recorder 22 captures events by registering with a DOM event listener of the web page under test which in turn reports events to the recorder 22. Additionally or alternatively, the recorder 22 captures events by registering with a window event listener of the web page which in turn reports events to the recorder 22. Other techniques for capturing events also fall within the scope of this disclosure. In either case, the captured events are passed along by the recorder 22 to the recorder UI 24. In an example embodiment, the captured events are communicated using web messaging (e.g., introduced in the WHATWG HTML5 draft specification as "Custom Events" https://www.w3.org/TR/uievents/#extending-events) although other types of messaging mechanism are contemplated by this disclosure.

The recorder UI 24 is configured to receive the captured events and compile a test script. More specifically, a script composer 41 receives the event messages from the recorder 22 and converts the events into a test script. In the example embodiment, the script composer 41 extracts key information from the DOM event such as event type, target element, event details specific to that type etc and tries to persist that information in JSON format as an action. The script composer 41 also generates a list of identifiers for target element based on various attributes that uniquely identifies the target element, such as ID of an element, text inside an element and CSS classes applied to an element. This list of element identifiers is called locators and they will also be stored in the action so that playback engine can relocate the same element to perform the same action in future. Such methods are found in existing recorders and further explanation is omitted for brevity.

After recording has been completed, the script composer 41 passes the test script onto a script dispatcher 42. The script dispatcher 42 in turn transmits the test script to web portal UI 26. In an example embodiment, the web portal UI 26 includes an inline frame for the recorder UI 24 and the test script is transmitted via web messaging using the inline frame. It is noted that the messaging occurs at the page level and not at the operating system level. In this way, the recorder 22 and the recorder UI 24 can be implemented independently from the operating system of the host computing device. Other techniques for communicating the test script are also contemplated by this disclosure. The recorder UI 24 is also implemented as a browser extension of the web browser.

A script receiver module 43 of the web portal UI 26 is configured to receive the test script from the recorder UI 24. The save script module 44 of the web portal UI 26 can then save the test script remotely to a server associated with the web portal. The web portal UI 26 also enables a user to access and retrieve a previously stored test script from the web portal. Specifically, an edit script module 45 of the web portal UI 26 retrieves a test script from the server and a script dispatcher 46 of the web portal UI 26 transmits the test script to the recorder UI 24.

Figure 4D:
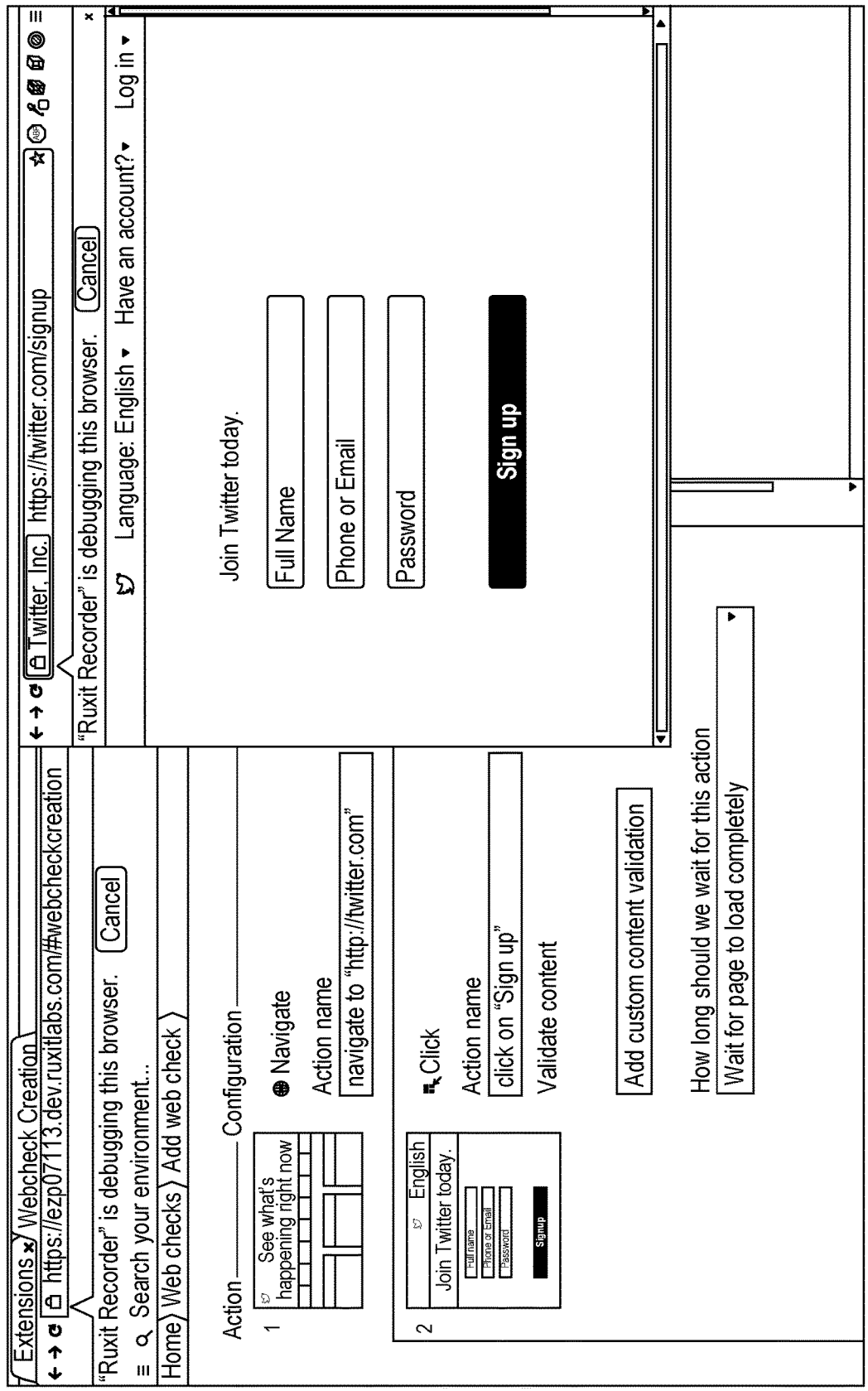
FIG. 4D is an example user interface for playing back a test script.

The recorder UI 24 provides different interfaces by which a user interacts with the recorder 22. For example, FIG. 4C depicts an example user interface for editing a test script. Actions which comprise the test script are listing sequentially on screen. In this example, a 'Navigate' action is followed by four 'Tap' actions. Each action can be expanded to add content validations, edit wait time or adjust input text where needed. FIG. 4D depicts an example user interface for playing back a test script. In this example, Twitter is the web page under test. During the playback, the web page under test is shown in a window overlaid on a portion of the screen. In the background window, the actions from the test script that are being simulated on web page are presented. These are merely illustrative of the types of user interfaces presented to a user by the recorder UI 24. Other interfaces may also be needed for the overall operation of the system.

Figure 5A:
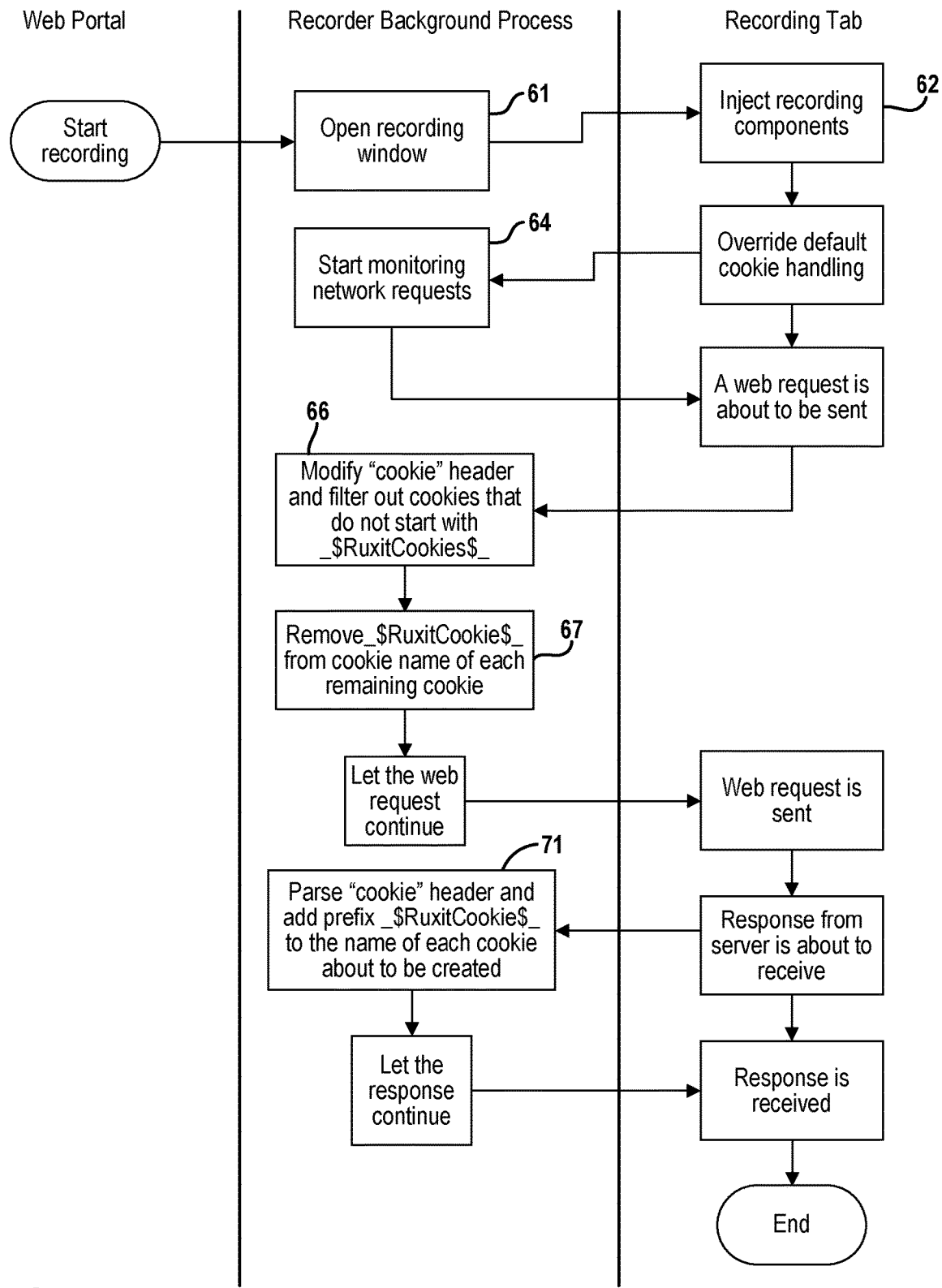

Various features have been incorporated into the recorder 22 to support script creation and playback. Referring to FIGS. 5A-5C, one feature is creation of a virtual profile that manages cookies, commonly known as session-related information associated with the website under test, on the host computing device. In an example use case, when a user accesses a website they are already logged into, the website is accessed without prompting the user to login. Likewise, if a user is creating a script for a website they are already logged into, the website will be accessed without prompting the user to login. Consequently, the test script for the website is created without a login sequence and the test script will fail, for example when executed on a different hosting device. Thus, the recorder 22 is configured to create new cookies on the recording device such that existing cookies are not disturbed, while also managing existing cookies so that a script can execute properly.

In an example embodiment, cookies associated with the recording and playback of the recorder are tagged with a special identifier as will be further described below. Upon starting of a recording, the recorder background process opens a recording window at 61 and coordinates with the recording tab to inject recording components at 62 into the content on the web page under test as seen in FIG. 5A.

During the recording, the recorder background process monitors network requests made by the web page under test at 64. Upon detecting a network request, the recorder modifies the cookies names in the header of the web request. Cookies associated with the recording or playback process have been assigned a special identifier. Cookies without a special identifier are not associated with the recording or playback process and thus should be ignored when processing the detected network request. In an example embodiment, cookies without the special identifier are removed at 66 from the header of the web request. In this way, such cookies will not be affected by the recording of the test script.

Each of the remaining cookies in the header of the web request has a special identifier and thus is associated with the recording or playback. In the example embodiment, the special identifier is a prefix appended to the cookie name (e.g., a prefix "$RuxitCookies$") although other types of identifiers are also contemplated by this disclosure. For each of these cookies, the special identifier is removed at 67 so that they may be properly access when servicing the network request. The processing of the network request is then permitted to proceed.

Upon receiving a response to the network request, the recorder background process again parses the header of the web response at 71. Cookies identified in the header of the network response are part of the recording or playback. Accordingly, the special identifier is added to the name of each cookie in the header of the network response. Processing of the network response is then permitted to proceed.

During recording, the recorder 22 must also monitor and detect local assess to cookies by the web page under test. In FIG. 5B, the recorder tab detects when a cookie is about to be created by a Javascript of the web page under test. In one embodiment, the recorder tab can register with event listeners to detect cookie creation. Upon detecting creation of a cookie at 81, the special identifier (i.e., prefix "$RuxitCookies$") is added at 82 to the name of the cookie being created. The cookie is then created at 83.

Likewise, in FIG. 5C, the recorder detects when a cookie is about to be accessed by a Javascript of the web page under test. The recorder tab can again register with event listeners to detect cookie access. Upon detecting cookie access at 84, the special identifier is removed at 85 from the name of the cookie about to be accessed. The cookie is then accessed at 86. Example pseudocode for detecting when cookies are accessed is as follows:

```
document.__defineSetter__("cookie", function(cookie) {
    document.dispatchEvent(new CustomEvent("ruxitify-cookies",
{detail: cookie}));
});
document.__defineGetter__("cookie", function( ) {
    document.dispatchEvent(new CustomEvent("normalize-cookies"));
    var cookies;
    try {
        cookies = localStorage.getItem(" ' + ruxitStore + ' ");
        localStorage.removeItem(" ' + ruxitStore + ' ");
    } catch { }
    return cookies;
});
```

Collectively using these methods, cookies manipulated during the recording or playback are isolated from the remainder of the cookies residing on the host computing device.

Another enhanced feature of the recorder 22 is automatically encrypting designated fields of the website under test. For example, the user may be prompted to enter a password or otherwise provide security credentials to the website. The password may be encrypted before being added to the test script. While reference is made to password, the auto encrypt feature may be extended to any user designated field in the website under test.

Figure 6A:
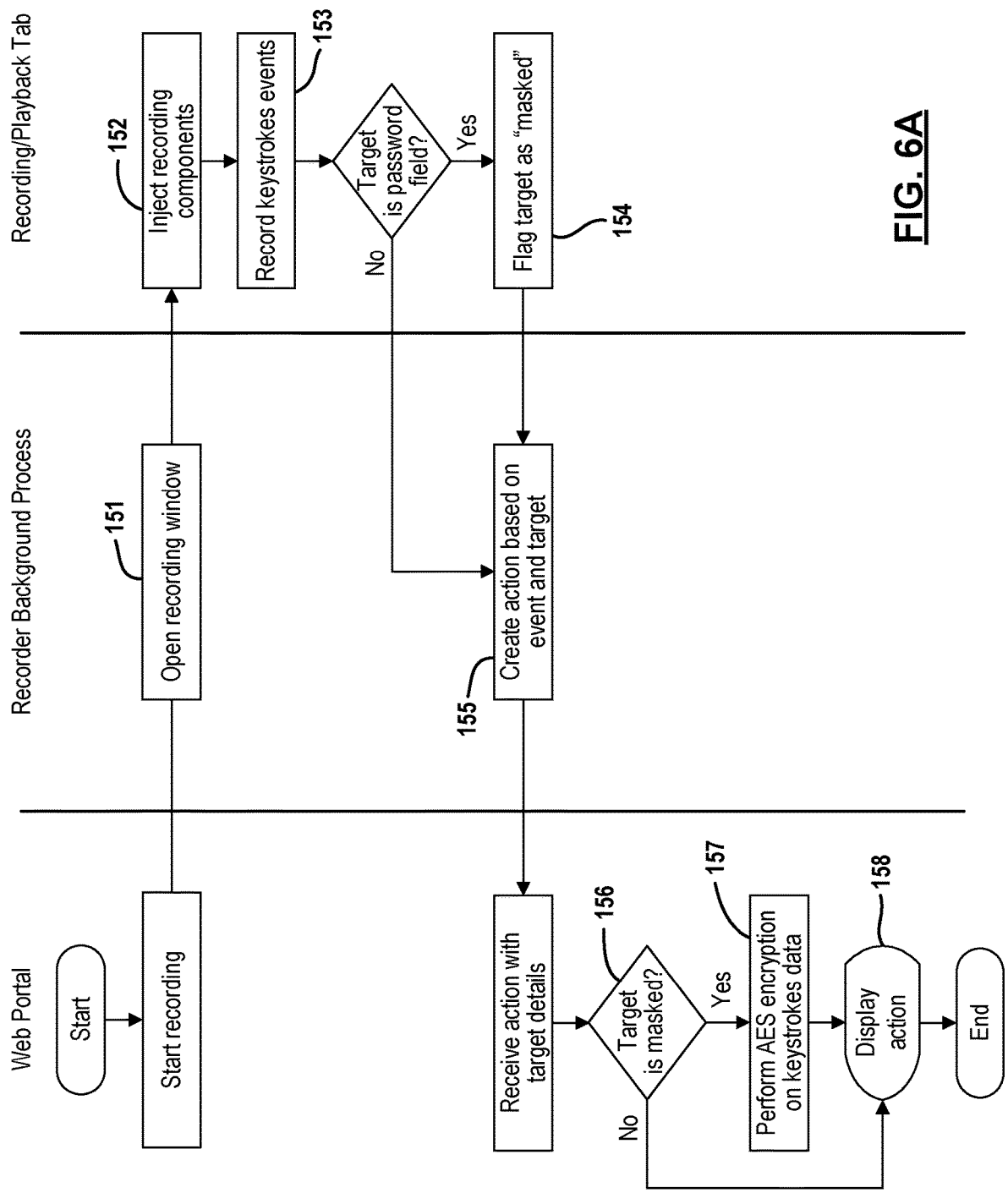
FIGS. 6A and 6B are flow diagrams illustrating a technique for encrypting designated field during recording and playback, respectively.

On the recorder side, the recorder background process opens a recording window at 151 and coordinates with the recording tab to inject recording components at 152 into applicable content on the web page under test as seen in FIG. 6A. During recording, keystrokes are captured at 153 by the recording tab. Designated fields, such as passwords, are flagged (e.g., as 'masked'). From the keystrokes, recorded actions are created at 155 and then placed in the test script. The test script is in turn passed along to the web portal user interface 26 as described above. Before the test script is saved by the web portal user interface 26, characters for each of the flagged fields are encrypted at 157. In an example embodiment, characters are encrypted using the Advanced Encryption Standard although other encryption schemes may be used as well.

Figure 6B:
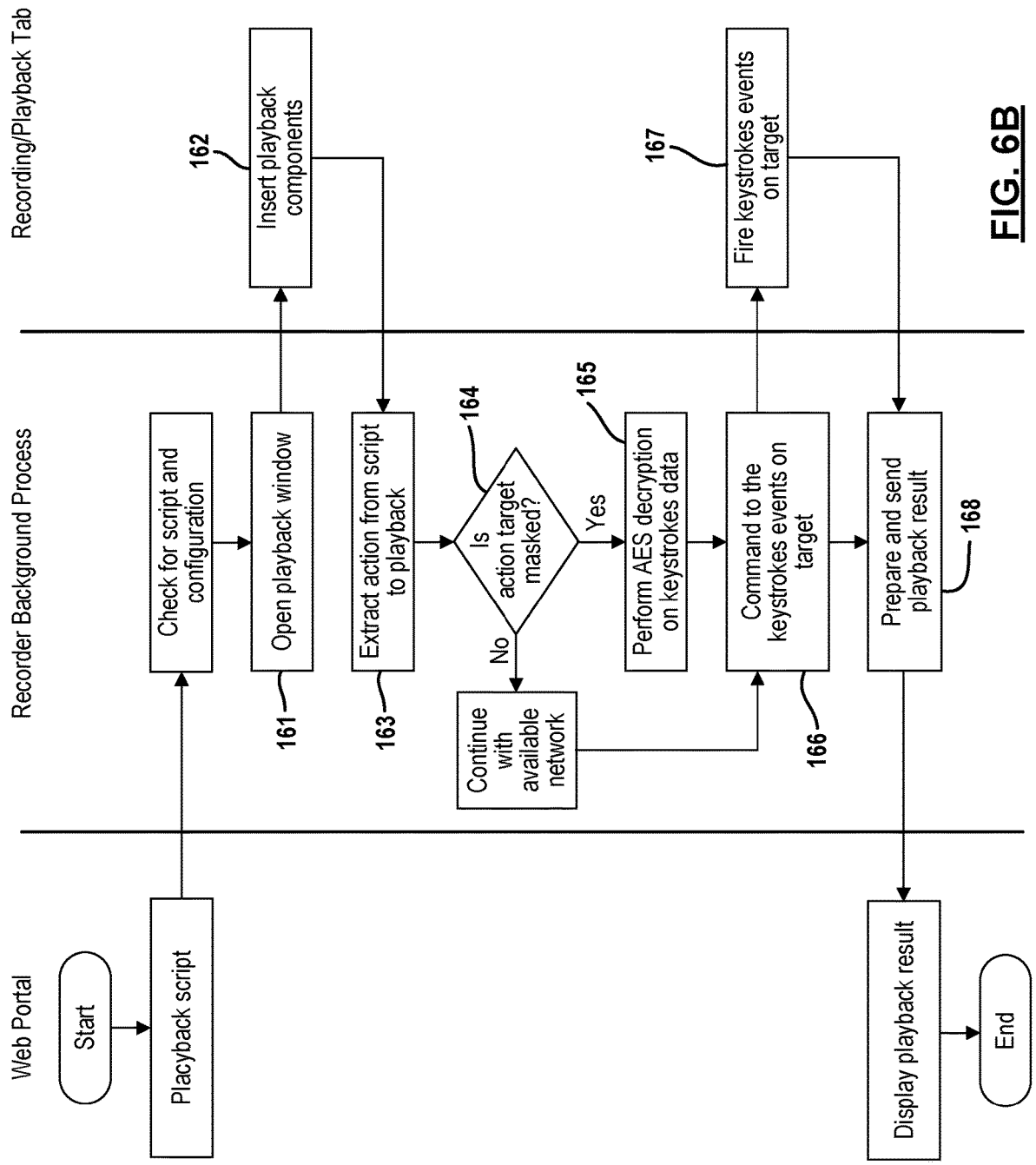

On the playback side, the recorder background process likewise opens a playback window at 161 and coordinates with the playback tab to inject playback components at 162 into applicable content on the web page under test as seen in FIG. 6B. Actions are retrieved from the test script at 163 by the recorder background process and played back at 167 by the playback tab. If an action contains a flagged field, then characters associated with the flagged field are decrypted at 165 by the recorder background process. In some embodiments, the decrypted characters are displayed on the user interface while the action is being executed on the playback device. In other embodiments, the web browser will mask or obscure the decrypted characters on the user interface while the action is being executed on the playback device. This process is repeated for each action in the test script.

Figure 7:
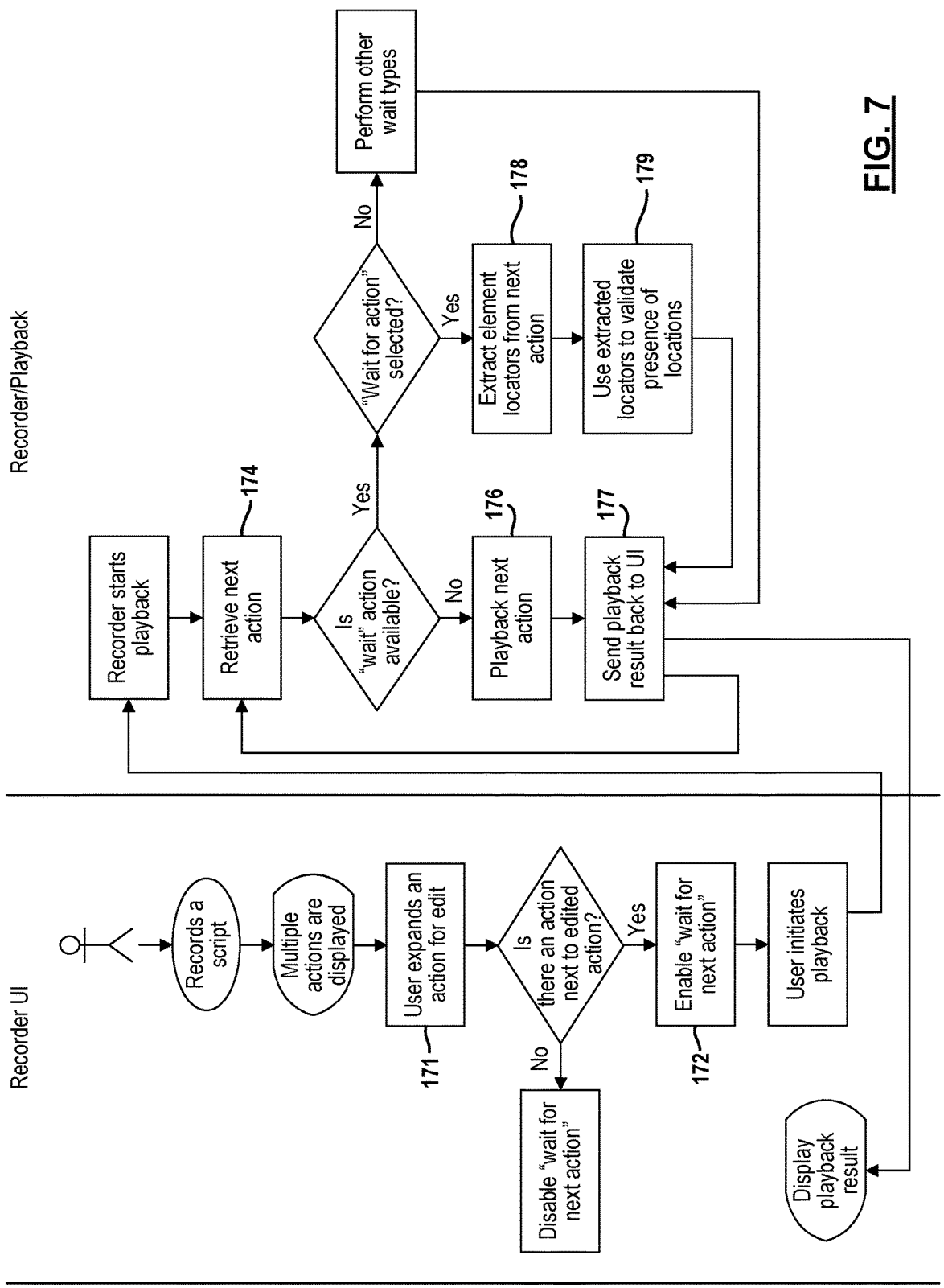
FIG. 7 is a flow diagram illustrating a technique for implementing a wait criterion of a test script by the synthetic test recorder.

During script creation and playback, it may be beneficial to specify a wait criterion. For example, during a login sequence there may be a delay while user credentials are authenticated by a remote server. An account number or other identifying information for the user is returned once the user is authenticated. To ensure proper execution of such actions, a wait criterion may be specified as seen in FIG. 7. Multiple actions typically comprise a test script. During script editing, a user expands the list of actions which comprise the test script as indicated at 171. In the case of a login sequence, the user enables the 'wait for next action' function at 172 for the user authentication action. While reference is made to a login sequence, it is readily understood that other types of actions (e.g., credit card validation) may be assigned a wait criterion.

During script playback, actions which comprise the test script are executed in order. After one action is executed, the playback agent retrieves another action in the test script as indicated at 174. For most actions, the current action is played back at 176 and the results are sent back at 177 to the web portal UI. For actions designated as 'wait for next action', playback agent will wait before executing the next action. Specifically, the playback agent will extract element locators at 178 from the next action (i.e., action following the current action in the test script). Continuing with the example above, assuming a logout action follows the login in the test script. Element locators for the logout action might include a link string for a hyperlink, CSS class selectors, particular element identifiers, etc. Element locators are then used at 179 to validate the presence of the logout screen. Presence of the logout screen satisfies the wait criterion such that the next action can be performed by the playback agent. At 177, the results can also be sent back to the web portal UI. In this way, the wait feature ensures proper playback of a test script for different network connections and other playback conditions. If the element locators are modified by the user, 'wait for next action' will dynamically adjust to wait for the modified criteria.

Likewise, during script creation, it may be beneficial to specify the network conditions under which the test script is to be executed. For example, it may be desirable to execute a test script on a device having 3G connectivity or on a device having 4G connectivity. The recorder 22 enables the script creator to specify such network conditions.

Figure 8:
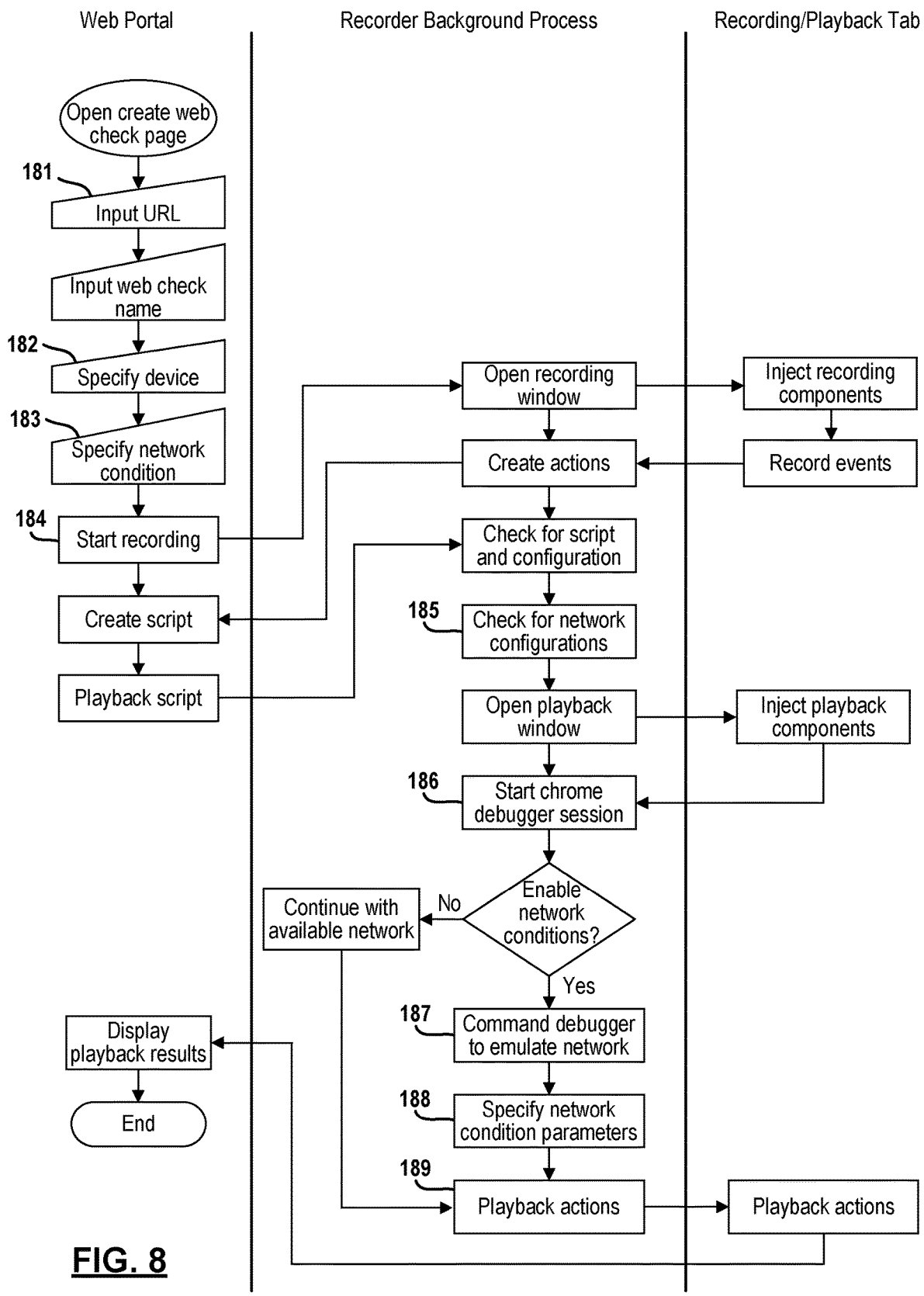
FIG. 8 is a flow diagram illustrating a technique for simulating user specified network conditions during playback of a test script.

Referring to FIG. 8, script creation begins at 181 by inputting the URL of the web page under test. Additionally, the target device type can be specified at 182 as well as the network conditions at 183. For example, the user may specify the target device as being an Apple IPhone 6 having 3G connectivity. The specified network conditions are stored in association with the test script. The recorder 22 then proceeds with the recording process at 184 in the same manner as described above.

During script playback, the specified network conditions are simulated by the web browser. In this regard, the specified network conditions are retrieved at 185 from the test script being played back. In one embodiment, the network conditions can be emulated by configuring the web browser in accordance with the specified network conditions. For example, Chrome browser and Safari browser have a network throttling feature that can be configured to simulate the specified network conditions. It is understood that other web browsers may have similar features for simulating network conditions. The recorder background process opens the playback window and injects playback components into applicable content of the web page under test.

Next, the browser debugger session is started by the recorder at 186. Assuming network conditions have been specified in the test script, the debugger is prepared for emulation at 187 and the specified network conditions are passed at 188 to the debugger. Actions from the test script can then be played back at 189 by the playback agent in accordance with specified network conditions.

Figure 9:
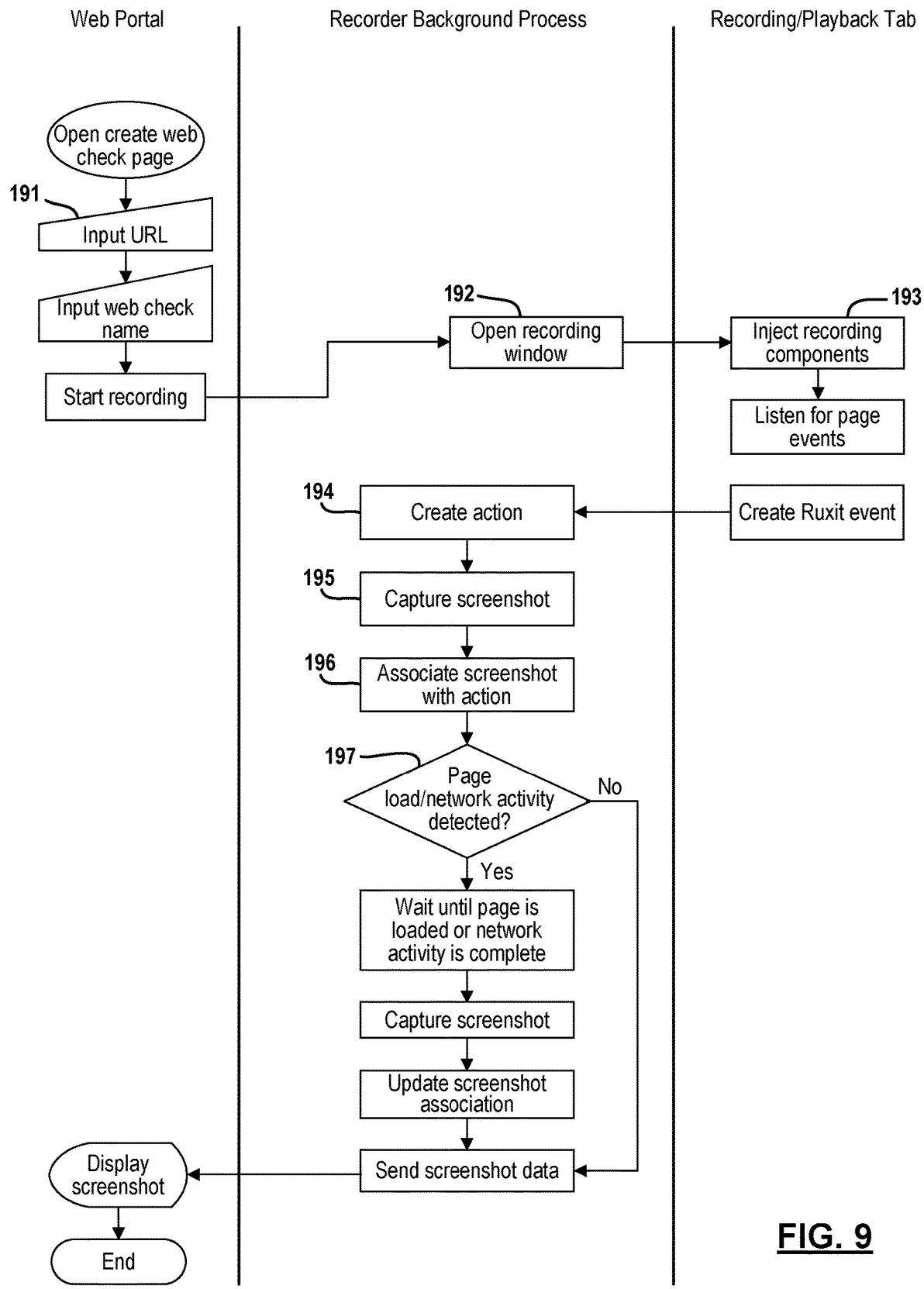
FIG. 9 is a flow diagram illustrating a technique for capturing screen shots associated with actions in a test script.

Another enhanced feature of the recorder 22 is capturing and storing screenshots during creation of a test script as seen in FIG. 9. Script creation begins at 191 by inputting the URL of the web page under test into the interface of the web portal. The recorder background process opens a recording window at 192 and coordinates with the recording tab to inject recording components at 193 into applicable content of the web page under test.

While navigating through a transaction on the web page, the recorder 22 is configured to capture events received from the web page under test and record the captured events in a test script. As noted above, events are converted to actions at 194 by the script composer 41. Concurrently therewith, a screenshot is captured at 195 by the script composer 41. In an example embodiment, a screenshot may be captured by making a function call to web browser, where web browsers, including Chrome and Safari, support a function for capturing screenshots. The captured screenshot is associated with the action and stored therewith in the test script.

The recorder also monitors at 197 whether a captured event results in a page update, a page load or some other network activity. The recorder also monitors the completion of such network activity. Once the network activity has been completed, a screenshot is again captured at 198 by the script composer 41. In one embodiment, the previously captured screenshot for the triggering event is replaced at 199 with the most recently captured screenshot. In other embodiments, the most recently captured screenshot is stored in addition of the previously captured screenshot. In either way, one or more screen shots are stored in connections with each action of a test script. The screenshots can be subsequently presented to a user when editing the test script or during playback of the test script. It is also envisioned that screenshots do not need to be captured for all actions but may be captured for select actions or types of action in the test script The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented system that enables automated generation of test sequences for testing of web applications operating within a web browser executing on a host computing device, comprising:
   a processor of the host computing device;
   a storage medium on the host computing device having computer program instructions stored thereon, wherein the computer program instructions, when executed by the processor, perform processing of:
   a recorder configured to capture events received from a web page under test and operable to record the captured events in a test script, where the test script is defined in accordance with a scripting language and the test script provides data for reproducing a test sequence for the web page under test, wherein the recorder is implemented as a browser extension of the web browser;
   wherein the recorder, during recording of the captured events, is configured to detect events that send a network request and, in response to detecting an indication that the network request is initiated and before sending the network request over a network for a remote servicing of the network request, automatically performs the steps of:
   determining whether each data of a plurality of data associated with the network request is associated with the test sequence for the web page under test, wherein the determining, for each data of the plurality of data further either: 1) removes the data from the network request, if the data is not associated with the test sequence or 2) tags the data with an identifier, if the data is associated with the test sequence; and
   capturing a screenshot associated with the test sequence; wherein subsequent to the capturing, the recorder, further performs the steps of:
   sending the network request that contains tagged data; and recording the screenshot, tagged data and data for an associated response from the servicing the network request, in the captured events; and generate the test script based on the captured events; and a recorder interface configured to receive the test script from the recorder and transmit the test script from the computing device via a web portal to a server located remotely from the computing device, where the test script is transmitted from the recorder interface to the web portal using web messaging.

2. The computer-implemented system of claim 1 wherein the web portal includes an inline frame for the recorder interface.

3. The computer-implemented system of claim 1 wherein the recorder interface includes an inline frame for the recorder and the test script is transmitted from the recorder to the recorder interface using browser messaging.

4. The computer-implemented system of claim 1 wherein the recorder captures events by at least one of registering with a Document Object Model (DOM) event listener of the web page under test and registering with a window event listener of the web page under test.

5. The computer-implemented system of claim 1 wherein web portal is configured to load the web page under test and, in response to loading the web page under test, determine whether the record is installed on the host computing device.

6. The computer-implemented system of claim 1 wherein web portal is configured to download the recorder from an app store in response to a determination that the recorder is not present on the computing device.

7. The computer-implemented system of claim 1 wherein removing data from the network request further comprises identify cookies in a header of the network request and previously tagged by the recorder; remove tag from each of the identified cookies in the header and process the network request using the identified cookies.

8. The computer-implemented system of claim 7 wherein the recorder deletes cookies in the header of the network request that were not previously tagged by the recorder.

9. The computer-implemented system of claim 7 wherein tagging data received with the response further comprises appending a tag to name of cookies in the header of the response.

10. The computer-implemented system of claim 7 wherein the recorder detects occurrence of a cookie being created by the web page under test and appending a tag to name of the cookie being created.

11. The computer-implemented system of claim 1 wherein the recorder captures one or more characters input to the web page under test, encrypts the one or more characters and stores the encrypted one or more characters in the test script.

12. The computer-implemented system of claim 1 wherein the web portal is configured to receive a wait criterion for executing a given action in a list of actions, where the test script is comprised of the list of actions and the list of actions is presented on a display.

13. The computer-implemented system of claim 12 wherein, upon retrieving the given action during playback of the test script, the recorder extracts HTML element locators from action following the given action in the test script and monitors the web page for the presence of the extracted HTML element locators.

14. The computer-implemented system of claim 13 wherein, upon detecting presence of the extracted HTML element locators in the web page, the recorder plays back the action that follows the given action in the test script.

15. The computer-implemented system of claim 1 wherein the web portal is configured to receive an indicator for network connection between the host computing device and a web server for the web page under test, and the recorder emulates the network connection during play back of the test script.

16. The computer-implemented system of claim 1 wherein the web portal determines whether the recorder is installed on the host computing device by checking for HTML elements associated with the recorder.

17. The computer-implemented system of claim 1 wherein the data for the web page shared between the web browser and the web server is represented as cookies.

18. A computer-implemented system that enables automated generation of test sequences for testing of web applications operating within a web browser executing on a host computing device, comprising:

a processor of the host computing device;

a storage medium on the host computing device having computer program instructions stored thereon, wherein the computer program instructions, when executed by the processor, perform processing of:

a recorder configured to capture events received from a web page under test and operable to record the captured events in a test script, where the test script is defined in accordance with a scripting language and the test script provides data for reproducing a test sequence for the web page under test, wherein the recorder is implemented as a browser extension of the web browser;

wherein the recorder, during recording of the captured events, is configured to detect events that send a network request and, in response to detecting the network request is initiated and before sending the network request over a network for a remote servicing of the network request, automatically performs the steps of:

determining whether each session information of a plurality of session information associated with the network request is associated with the test sequence for the web page under test, wherein the determining, for each session information of the plurality of session information further either: 1) removes the session information, if the session information is not associated with the test sequence or 2) tags the session information with an identifier, if the session information is associated with the test sequence; and capturing a screenshot associated with the test sequence; wherein subsequent to the capturing, the recorder, further performs the steps of:

sending the network request that contains tagged session information; and recording the screenshot, tagged session information, and data for an associated response from the servicing the network request, in the captured events; and generate the test script based on the captured events; and a recorder interface configured to receive the test script from the recorder and transmit the test script from the computing device via a web portal to a server located remotely from the computing device, where the test script is further transmitted from the recorder to the recorder interface using browser messaging and the test script is transmitted from the recorder interface to the web portal using web messaging; wherein the web portal includes an inline frame for the recorder interface.

19. The computer-implemented system of claim 18 wherein the session information is further defined as a cookie.

20. A computer-implemented system that enables automated generation of test sequences for testing of web applications operating within a web browser executing on a host computing device, comprising:
- a processor of the host computing device;
- a storage medium on the host computing device having computer program instructions stored thereon, wherein the computer program instructions, when executed by the processor, perform processing of:
  - a recorder configured to capture events received from a web page under test and operable to record the captured events in a test script, where the test script is defined in accordance with a scripting language and the test script provides data for reproducing a test sequence for the web page under test, wherein the recorder is implemented as a browser extension of the web browser;
  - wherein the recorder, during recording of the captured events, is configured to detect events that send a network request and, in response to detecting the network request is initiated and before sending the network request over a network for a remote servicing of the network request, automatically performs the steps of:
  - determining whether each session information of a plurality of session information associated with the network request is associated with the test sequence for the web page under test, wherein the determining, for each session information of the plurality of session information further either: 1) removes the session information, if the session information is not associated with the test sequence or 2) tags the session information with an identifier, if the session information is associated with the test sequence; and
  - capturing a screenshot associated with the test sequence; wherein subsequent to the capturing, the recorder, further performs the steps of:
  - sending the network request that contains tagged session information; and
  - recording the screenshot, tagged session information, and data for an associated response from the servicing the network request, in the captured events; and
  - generate the test script based on the captured events;
  - a recorder interface configured to receive the test script from the recorder and transmit the test script from the computing device via a web portal to a server located remotely from the computing device, where the test script is further transmitted from the recorder to the recorder interface using browser messaging and the test script is transmitted from the recorder interface to the web portal using web messaging;
  - wherein web portal is configured to load the web page under test and, in response to loading the web page under test, determine whether the recorder is installed on the host computing device.

* * * * *